(12) United States Patent
Jansen et al.

(10) Patent No.: US 7,946,499 B2
(45) Date of Patent: May 24, 2011

(54) METHOD FOR INITIALIZING AND/OR PERSONALIZNG A PORTABLE DATA CARRIER

(75) Inventors: Jens Jansen, Oberägeri (CH); Thomas Tarantino, Laufen (DE); Ralph Krysiak, Markt-Schwaben (DE)

(73) Assignee: Giesecke & Devrient GmbH, Munich (DE)

( * ) Notice: Subject to any disclaimer, the term of this patent is extended or adjusted under 35 U.S.C. 154(b) by 573 days.

(21) Appl. No.: 11/919,230

(22) PCT Filed: Apr. 28, 2006

(86) PCT No.: PCT/EP2006/003990
§ 371 (c)(1),
(2), (4) Date: Oct. 25, 2007

(87) PCT Pub. No.: WO2006/117152
PCT Pub. Date: Nov. 9, 2006

(65) Prior Publication Data
US 2009/0289122 A1     Nov. 26, 2009

(30) Foreign Application Priority Data

Apr. 29, 2005   (DE) .......................... 10 2005 020 093
Aug. 2, 2005    (DE) .......................... 10 2005 036 303

(51) Int. Cl.
*G06K 19/06*            (2006.01)
(52) U.S. Cl. ......................................... 235/492; 438/13
(58) Field of Classification Search .................. 235/487, 235/492, 439, 441, 451, 488, 442; 438/6, 438/12, 13, 113, 131; 340/572.1, 10.1, 10.51, 870.31, 5.61, 5.64
See application file for complete search history.

(56) References Cited

U.S. PATENT DOCUMENTS

| | | | |
|---|---|---|---|
| 3,624,938 A | | 12/1971 | Lewis |
| 4,361,756 A | | 11/1982 | Parmentier et al. |
| 4,786,791 A | | 11/1988 | Hodama et al. |
| 4,792,843 A | * | 12/1988 | Haghiri-Tehrani et al. ... 257/679 |
| 5,376,778 A | | 12/1994 | Kreft |
| 5,874,902 A | * | 2/1999 | Heinrich et al. ........... 340/10.51 |
| 5,917,909 A | | 6/1999 | Lamla |
| 6,073,856 A | * | 6/2000 | Takahashi .................... 235/492 |
| 6,095,416 A | | 8/2000 | Grant et al. |
| 6,343,744 B1 | * | 2/2002 | Shibata et al. ............... 235/492 |
| 6,386,459 B1 | * | 5/2002 | Patrice et al. ................ 235/492 |
| 6,425,526 B1 | * | 7/2002 | Fidalgo et al. ............... 235/492 |
| 6,467,692 B1 | * | 10/2002 | Tarantino et al. ............ 235/492 |
| 6,484,945 B1 | * | 11/2002 | John et al. .................... 235/487 |
| 6,568,600 B1 | * | 5/2003 | Carpier et al. ............... 235/492 |
| 6,601,770 B1 | * | 8/2003 | Ikefuji et al. ................. 235/492 |
| 6,601,779 B1 | * | 8/2003 | Heren et al. .................. 239/251 |

(Continued)

FOREIGN PATENT DOCUMENTS

DE            42 05 827 A1       9/1993
(Continued)

*Primary Examiner* — Michael G Lee
*Assistant Examiner* — Suezu Ellis
(74) *Attorney, Agent, or Firm* — Bacon & Thomas, PLLC

(57) ABSTRACT

A method for either or both initializing and personalizing a portable data carrier having an electronic circuit, a data transmission device and a switching device. The method is characterized in that either or both before the initialization and personalization is carried out a bridging of the switching device is formed and after either or both the initialization and personalization has been carried out the bridging is eliminated.

16 Claims, 2 Drawing Sheets

U.S. PATENT DOCUMENTS

| | | | |
|---|---|---|---|
| 6,863,220 B2* | 3/2005 | Selker | 235/492 |
| 7,578,431 B2* | 8/2009 | Tanner et al. | 235/375 |
| 7,699,232 B2* | 4/2010 | Koyama et al. | 235/492 |
| 7,731,094 B2* | 6/2010 | Phillips | 235/492 |
| 2002/0190364 A1 | 12/2002 | Dobashi et al. | |
| 2005/0116048 A1* | 6/2005 | Sauter et al. | 235/492 |
| 2006/0151618 A1* | 7/2006 | Kwon | 235/492 |
| 2007/0290051 A1* | 12/2007 | Bielmann et al. | 235/492 |
| 2009/0101720 A1* | 4/2009 | Dewan et al. | 235/492 |

FOREIGN PATENT DOCUMENTS

| | | |
|---|---|---|
| DE | 196 53 409 C2 | 7/1998 |
| DE | 197 42 126 A1 | 3/1999 |
| DE | 100 60 912 A1 | 6/2002 |
| DE | 10 2004 004 128 | 8/2005 |
| EP | 0 676 073 B2 | 10/1995 |

* cited by examiner

METHOD FOR INITIALIZING AND/OR PERSONALIZNG A PORTABLE DATA CARRIER

FIELD OF THE INVENTION

The invention relates to a method for initializing and/or personalizing a portable data carrier. Furthermore, the invention relates to a portable data carrier.

BACKGROUND

Portable data carriers can be very diversely used, for example, for carrying out payment transactions, as identification documents for access control purposes, as authorization proof for using a mobile telephone system etc. Before a portable data carrier can be used in an application, it is normally required to write data into a nonvolatile memory of the portable data carrier in connection with an initialization and a subsequent personalization. With the initialization, for example, supplements of an operating system of the portable data carrier, which is stored in a permanent memory of the portable data carrier, are written into the nonvolatile memory and file structures are created. Furthermore, the subsequent personalization is prepared. During the personalization, for example, applications are installed in and personal data is written into the nonvolatile memory. The borders between initialization and personalization are not fix, so that there are the possibilities to write the data into the portable data carrier during the initialization or during the personalization. In addition, it is possible to carry out an initialization and/or personalization with a portable data carrier that is already used in order to update the operating system or the application programs, to change or add personal data, or to install new applications.

Some portable data carriers have a manual switching device by the actuation of which a data transmission being permitted. Such switching devices in particular can be provided in portable data carriers, in which the data transmission is effected in a contactless fashion, and serve to protect from unauthorized access to the portable data carrier. When the user of the portable data carrier agrees to a data transmission, he activates the transmission by manually actuating the switching device. But such a switching device leads to problems when initializing or personalizing the portable data carrier, since for this purpose a data link between an external device and the portable data carrier has to be set up and the highly automated initialization or personalization process only in exceptional circumstances will be compatible with a manual actuation of the switching device.

Therefore, the invention is based on the problem to permit the initialization and/or personalization of a portable data carrier having a switching device with a reasonable effort in an efficient fashion.

SUMMARY

The method according to the invention for initializing and/or personalizing a portable data carrier that has an electronic circuit, a data transmission device and a switching device, is characterized in that before the initialization and/or personalization is carried out a bridging of the switching device is formed and after the initialization and/or personalization has been carried out the bridging is eliminated.

The invention has the advantage that the initialization and/or personalization of a portable data carrier having a switching device can be executed with a similarly high automation level as it is the case with a portable data carrier without switching device. With that the wide use of portable data carriers with switching device is substantially facilitated.

Preferably, it is provided that with the switching device a data transmission can be activated that is contactlessly executed via the data transmission device. This has the advantage that the user of the portable data carrier can control the contactless data transmission. The data transmission device can also be activated by a voltage source being connected with the electronic circuit via the switching device.

The bridging of the switching device can be formed as a component of the portable data carrier. With that it is permitted that, substantially, the initialization or personalization process can be carried out in the way known in the art with the help of known and thus already available machines, wherein the portable data carrier is to be modified according to the invention before and after the initialization or personalization process. It is especially advantageous, when the bridging of the switching device is formed when manufacturing the portable data carrier, since this requires only little additional effort.

The switching device is preferably bridged by a permanently connected electrical connecting element. This requires little effort and ensures a reliable bridging. For eliminating the bridging the electrical connecting element (at least partially) can be removed or destroyed. This can be realized in multiple ways and, likewise, requires only little effort. For example, in the area of the electrical connecting element a part of the portable data carrier is removed. This has the additional advantage, that it is easily recognizable, whether the bridging of the switching device still exists. In a variant of the method according to the invention the electrical connecting element is at least partially removed or destroyed by mechanical action. In particular, the electrical connecting element can at least be partially removed when a cavity for the switching device is formed, so that an additional effort for the removal is not required. In a further variant of the method according to the invention the electrical connecting element is at least partially removed or destroyed by supplying energy. Here in particular it is possible, that the energy is supplied to a receiving device which is formed as a component of the electrical connecting element. A further alternative provides that the electrical connecting element serving for bridging extends in the high-embossed area of the card. On high-embossing, which takes place after the electrical personalization, the bridging is interrupted at at least one position.

The portable data carrier according to the invention has an electronic circuit for storing and/or processing data, a data transmission device and a switching device. The characteristic feature of the portable data carrier according to the invention is that in parallel to the switching device an electrical connecting element is connected, which bridges the switching device or which is partially removed or destroyed, so that an initially formed bridging of the switching device is eliminated by the electrical connecting element.

The switching device is preferably connected to the data transmission device. In particular it is provided, that the usability of the data transmission device for a data transmission depends on the actuating state of the switching device, when the bridging of the switching device initially formed by the electrical connecting element has been eliminated.

The portable data carrier according to the invention is preferably formed as a chip card.

BRIEF DESCRIPTION OF THE DRAWINGS

In the following the invention is explained with reference to the embodiments represented in the Figure, in which the portable data carrier has the form of a chip card. However, the invention is not restricted to chip cards, but equally refers to other portable data carriers. A portable data carrier within the meaning of the invention is a computer system, the resources, i.e. memory resources and/or computing capacity (computing power), of which are limited, e.g. a chip card (smart card, microprocessor chip-card) or a token or a chip module for being incorporated in a chip card or in a token. The portable data carrier has a body, in which a CPU (a microprocessor) is disposed, and which can have any standardized or not standardized shape, for example the shape of a flat chip card without any standard or according to a standard such as e.g. ISO 7810 (e.g. ID-1, ID-00, ID-000) or the shape of a bulky token. The portable data carrier further can have one or a plurality of any interfaces for a contactless and/or contact-type communication with a reading device or data processing system (e.g. personal computer, workstation, server).

DETAILED DESCRIPTION OF THE PREFERRED EMBODIMENTS

Figure 1:
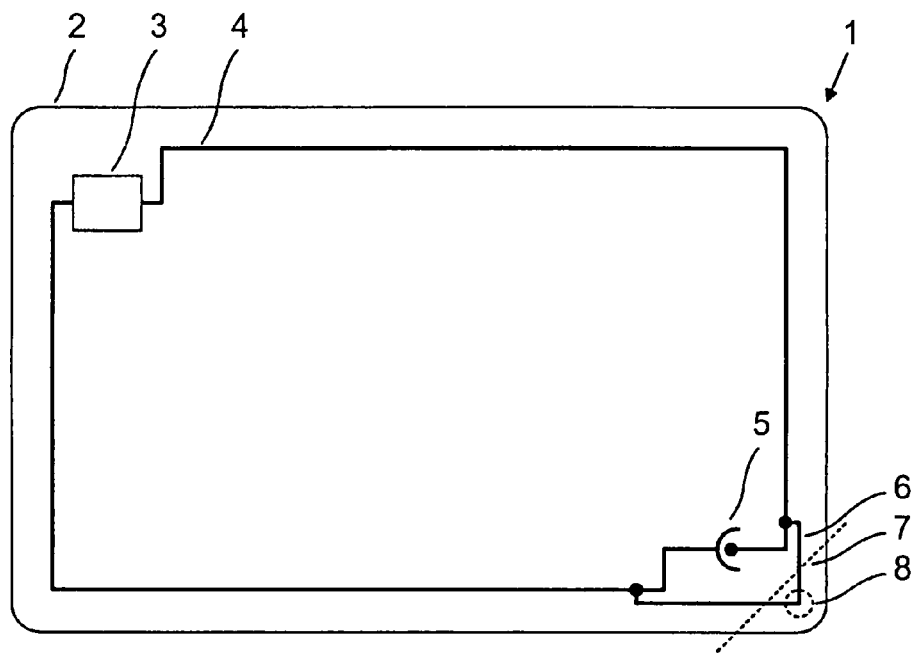
FIG. 1 shows a first embodiment of a chip card formed according to the invention in a schematic top view.

FIG. 1 shows a first embodiment of a chip card 1 formed according to the invention in a schematic top view. FIG. 1 also shows the components that are disposed inside chip card 1. If nothing different is mentioned, the explanations made in the following for the first embodiment of chip card 1 will also apply to the further embodiments.

Chip card 1 has a card body 2, which with respect to its dimensions, for example, is formed according to the standard ISO/IEC 7810, and in which a microcontroller 3 is embedded. Card body 2 is preferably made of plastic and for example can be manufactured by laminating a plurality of plastic foils. To microcontroller 3 an antenna 4 is connected, which in the shown embodiment is formed as a coil having a winding. The coil for example can have the form of a wire-wound coil or be realized with the help of conductive paths, which are applied to one or a plurality of the plastic foils of card body 2 in the form of a coil for example by printing technology. Likewise, the conductive paths can be manufactured by etching or in other ways. The free ends of the coil are connected with microcontroller 3. Alternatively to the shown embodiment, antenna 4 can also be formed as a coil having a plurality of windings or realized in other ways.

Antenna 4 is interrupted by a manually actuatable control switch 5. In parallel to control switch 5 an electrical connecting element 6 is connected, which bridges control switch 5 and thereby produces a state that corresponds to a not interrupted antenna 4 without control switch 5. Electrical connecting element 6 for example can be formed as a wire or as a conductive path.

Furthermore, in FIG. 1 are drawn a punched line 7, which can also have a different form than that shown in the Figure, and a perforation 8, which are provided alternatively and in each case are disposed in the area of the electrical connecting element 6. Punched line 7 and perforation 8 each are displayed by dashed lines, since a punching along punched line 7 or forming perforation 8 each are not executed until in the course of the method according to the invention and in the case of chip card 1 as shown in FIG. 1 both have not yet been carried out.

When a user uses chip card 1, a data transmission between microcontroller 3 and a not figuratively shown external device, which can have the form of a reading device known in the art, is carried out. The data transmission is contactlessly effected with the aid of antenna 4 connected to microcontroller 3. At the time when chip card 1 is used by the user, i.e. at a later point of time than shown in FIG. 1, electrical connecting element 6 is cut through by a punching along punched line 7 or by perforation 8. This means, that it depends on the actuating state of control switch 5, whether antenna 4 can be used for the contactless data transmission or not. Preferably, in the non-actuated state of control switch 5 antenna 4 is interrupted, so that a contactless data transmission with the aid of the antenna 4 is not possible. In the actuated state of control switch 5 the interruption of antenna 4 is eliminated and with the aid of antenna 4 a contactless data transmission can be carried out. In this way the user of the chip card 1 has the possibility to activate the data transmission by actuating control switch 5 or to prevent the data transmission by not actuating control switch 5.

Before the user uses chip card 1 for the first time, within the framework of an initialization process and/or personalization process data is written into microcontroller 3 of chip card 1. Normally, at first an initialization and then a personalization of chip card 1 is carried out. When initializing in particular supplements of the operating system are installed in microcontroller 3 and data structures are created. When personalizing for example application programs are implemented and personal data is written into microcontroller 3. Since in the context of the invention for the initialization and the personalization the same measures are taken, in the following the invention is described in more detail only with reference to the personalization. For each the initialization and the combined execution of the initialization and the personalization applies the same, i.e. the invention is equally suitable for the initialization and the personalization or a combination of both.

Before the personalization chip card 1 is formed as shown in FIG. 1, but neither the punching along punched line 7 nor perforation 8 is executed. This means, that the electrical connecting element 6, that was formed when manufacturing chip card 1, bridges control switch 5 and thus puts it out of action. Antenna 4, independent of the actuating state of control switch 5, is ready for a contactless data transmission between an external device and microcontroller 3, as long as electrical connecting element 6 is intact. Consequently, the personalization of the such prepared chip card 1 can be carried out in the way known in the art by the personalization data being contactlessly transmitted from a personalization device to antenna 4 of chip card 1 and thus to microcontroller 3.

When the personalization including optionally required checking measures or other measures that require a data link to microcontroller 3 is completed, a punching along the punched line 7 is carried out and thereby a corner of chip card 1 is removed.

Since punched line 7 crosses electrical connecting element 6, electrical connecting element 6 is permanently cut through by the punching operation. This means, that the bridging of control switch 5 formed by electrical connecting element 6 until this point of time is eliminated and from now on it depends on the actuating state of control switch 5, whether a contactless data transmission between an external device and microcontroller 3 is possible.

Instead of the punching along punched line 7 electrical connecting element 6 can also be cut through by forming perforation 8. Perforation 8 for example can be formed with the help of a punching operation. Likewise it is also possible to form perforation 8 by irradiation with a laser beam. In a variation the irradiation with the laser beam is executed such that the electrical connecting element 6 melts or evaporates in the irradiated area and thus is cut through, without perforation 8 being formed in card body 2.

Instead of perforation 8 cutting through the connecting element 6 can also be effected by a milling process, so that in the card merely a recess is produced.

Figure 2:
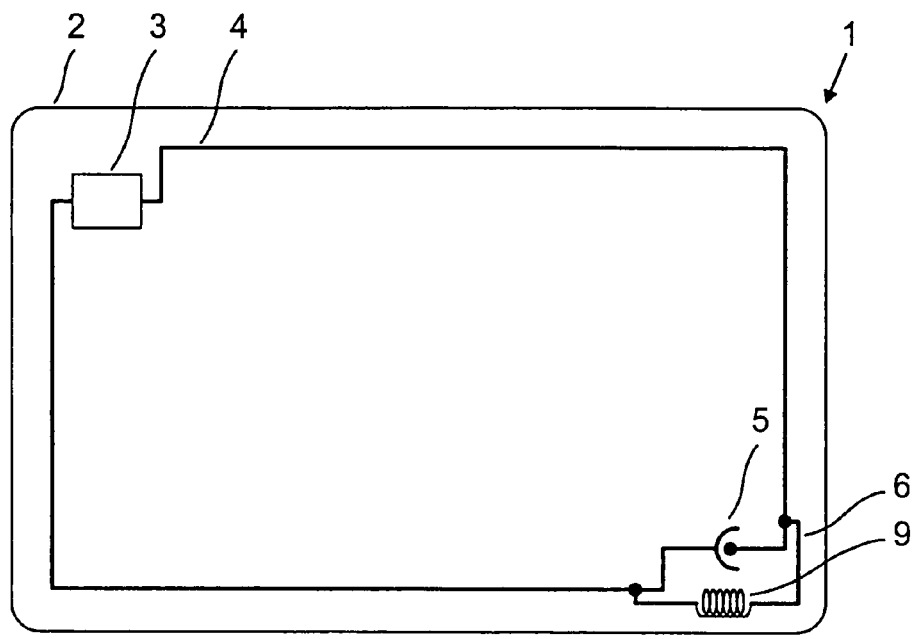
FIG. 2 shows a second embodiment of the chip card according to the invention in a representation corresponding to FIG. 1.

FIG. 2 shows a second embodiment of the chip card 1 according to the invention in a representation corresponding to FIG. 1. This embodiment to a large extent corresponds to the first embodiment. In particular, like in the first embodiment the electrical connecting element 6 is provided that bridges control switch 5. The characteristic feature of the second embodiment of chip card 1 is that electrical connecting element 6 has a small additional antenna 9, which is not provided in the first embodiment. Additional antenna 9 is adapted such that in a high-frequency field it absorbs so much energy, that the material of additional antenna 9 melts or evaporates. The consequence is an interruption of additional antenna 9 and thus also of electrical connecting element 6. Thus in the second embodiment of chip card 1 the bridging of control switch 5 can be eliminated by exposing additional antenna 9 to a suitable high-frequency field and thereby cutting through electrical connecting element 6 in the area of additional antenna 9. As in the first embodiment electrical connecting element 6 is cut through after the personalization has been carried out, so that thereafter the chip card 1 can be used in the described fashion by a user.

Figure 3:
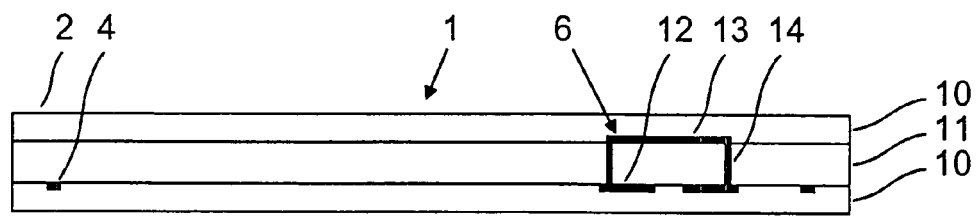
FIG. 3 shows a third embodiment of the chip card according to the invention in a schematic sectional view.

FIG. 3 shows a third embodiment of chip card 1 according to the invention in a schematic sectional view. As in FIGS. 1 and 2, in FIG. 3, too, chip card 1 is shown in the form provided for the personalization.

In the third embodiment of chip card 1 card body 2 consists of, for example, two cover foils 10 and an inner foil 11 disposed in between, which are permanently connected to each other by laminating. Onto inner foil 11 antenna 4 is applied. Furthermore, onto inner foil 11 two contact surfaces 12 are applied, which are components of the control switch 5 that will be finished at a later point of time, and are connected to the free ends of the interrupted antenna 4. In the third embodiment of chip card 1, too, the electrical connecting element 6 is provided and connects the two contact surfaces 12 to each other, so that antenna 4 is ready for operation.

Electrical connecting element 6 consists of a bridging 13, which, in relation to contact surfaces 12, is applied onto the back side of inner foil 11, and of two through-contactings 14, which extend through inner foil 11 and connect the two contact surfaces 12 with bridging 13. With that the chip card 1 shown in FIG. 3, despite the not yet finished control switch 5, is formed such that the personalization can be carried out.

After having completed the personalization and optionally other required additional operations electrical connecting element 6, like in the first two embodiments of chip card 1, is cut through, so that control switch 5 is usable when in the following chip card 1 is used. But cutting through the electrical connecting element 6 is carried out in a different fashion and combined with finishing control switch 5. This is explained with reference to FIG. 4.

Figure 4:
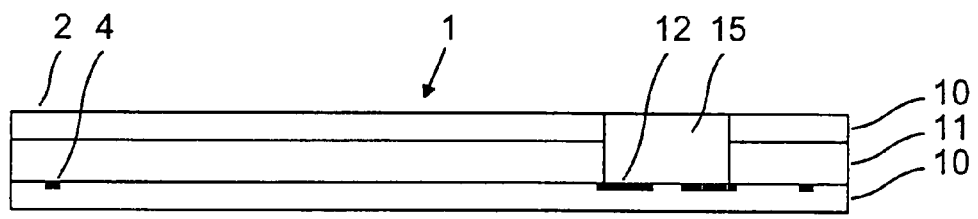
FIG. 4 shows the third embodiment of the chip card according to the invention in a representation corresponding to FIG. 3 after the electrical connecting element has been cut through and FIG. 5 shows an embodiment for an actuating apparatus for automatically actuating the control switch of the chip card in a schematic side view.

FIG. 4 shows the third embodiment of chip card 1 according to the invention in a representation corresponding to FIG. 3 after electrical connecting element 6 has been cut through. Electrical connecting element 6 is cut through when cavity 15 is formed, which extends in the area of electrical connecting element 6 through one of the cover foils 10 and the inner foil 11 to the further cover foil 10. When forming cavity 15, for example by means of a milling operation, bridging 13 and through-contactings 14 are partially removed or, as shown in FIG. 4, completely removed and thereby contact surfaces 12 of control switch 5 are uncovered. Then, a not figuratively shown insert for forming control switch 5 is implanted into cavity 15 and with that control switch 5 is finished. Now chip card 1 can be used in the already described fashion by the user and thereby the contactless data transmission can be activated with the help of control switch 5.

The three above-described embodiments have in common that control switch 5, which in the third embodiment has not yet been finished, in each case is bridged with the help of the electrical connecting element 6 and with that antenna 4 independent of the actuating state of control switch 5 is made ready for operation. This means that electrical connecting element 6 has to be formed before the personalization and after the personalization it has to be cut through. The formation of electrical connecting element 6 is preferably effected on manufacturing chip card 1. Alternatively, it is also possible to admit a chip card 1 that does not have an electrical connecting element 6 to the personalization. In order to permit an automated execution of the personalization in this case too, in the context of the invention an automated actuation of control switch 5 during the personalization is provided. This is explained in more detail with reference to FIG. 5.

Figure 5:
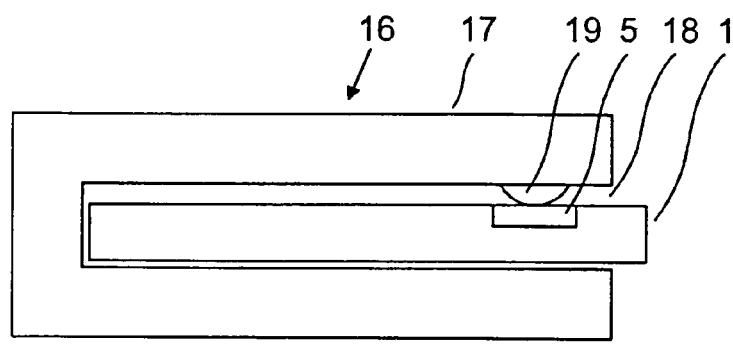

FIG. 5 shows an embodiment of an actuating apparatus 16 for automatically actuating control switch 5 of chip card 1 in a schematic side view. Actuating apparatus 16 has a housing 17, which has an opening 18 for inserting chip card 1. At the inner surface of housing 17 an actuating element 19 is disposed in a position, which corresponds to the position of the control switch 5 when chip card 1 is completely inserted into housing 17. Actuating element 19 is formed as a protrusion, which rests against control switch 5 of the inserted chip card 1 and actuates control switch 5. Actuating element 19 can be formed rigid or, alternatively, elastic.

For executing the personalization chip card 1 is inserted into actuating apparatus 16 by a suitable transport mechanism. Until this point of time control switch 5 has not been actuated and thus a contactless data transmission via antenna 4 of chip card 1 was not possible. By inserting chip card 1 into the actuating apparatus 16 chip card 1 is brought in a position, in which actuating element 19 presses against control switch 5 and thereby actuates it. In this way antenna 4 is put into operativeness and thus a contactless data transmission is permitted. Chip card 1 remains in this position until the personalization is completed. Then chip card 1 is taken out of actuating apparatus 16, so that actuating element 19 no longer is pressed against control switch 5 and thus the actuation of the control switch 5 is stopped. After chip card 1 being removed from actuating apparatus 16 it can be used in the described fashion by the user. In contrast to the first three embodiments of chip card 1, cutting an electrical connecting element 6 is not required, since the actuating apparatus 16 shown in FIG. 5 is used with chip cards 1 in which the electrical connecting element 6 for bridging the control switch 5 is not provided.

This also means, that with chip card 1 according to FIG. 5 control switch 5 is already ready for use before the personalization. Whether chip card 1 can actually be used by a user before the personalization, depends on whether the data that is written during the personalization process is required for this. Actuating apparatus 16 thus in particular is also suitable for carrying out a supplementary personalization of chip cards 1, with which a first personalization has already been carried out at a previous point of time.

The invention claimed is:

1. A method for either or both initializing and personalizing a portable data carrier, which has an electronic circuit, a data transmission device and a switching device, comprising the steps of:
    before executing either or both the initialization and personalization, forming a bridging of the switching device, and
    after executing either or both the initialization and personalization, eliminating the bridging,
    wherein a data transmission is activatable by the switching device, which is contactlessly executed via the data transmission device.

2. The method according to claim 1, wherein the bridging of the switching device is formed as a component of the portable data carrier.

3. The method according to claim 1, wherein the bridging of the switching device is formed during production of the portable data carrier.

4. The method according to claim 1, wherein the switching device is bridged by an electrical connecting element.

5. The method according to claim 4, wherein for eliminating the bridging, the electrical connecting element is at least partially removed or destroyed.

6. The method according to claim 5, wherein, in an area of the electrical connecting element, a part of the portable data carrier is removed.

7. The method according to claim 5, wherein the electrical connecting element is at least partially removed or destroyed by mechanical action.

8. The method according to claim 5, wherein the electrical connecting element extends in a high-embossed area of the portable data carrier and is partially removed or destroyed when the high-embossing is carried out.

9. The method according to claim 5, wherein the electrical connecting element is at least partially removed or destroyed by supplying energy.

10. The method according to claim 9, wherein the energy is supplied to a receiving device, which is formed as a component of the electrical connecting element.

11. A method for either or both initializing and personalizing a portable data carrier having an electronic circuit, a data transmission device and a switching device, wherein the switching device comprises two contact surfaces disposed in a cavity and an insert, comprising the steps of:
    at least partially removing an electrical connecting element initially connecting the two contact surfaces of the switching device to each other when the cavity for the switching device is formed, thereby cutting through the electrical connecting element, and
    after the cavity has been formed placing the insert for completing the switching device into the cavity.

12. A portable data carrier having an electronic circuit for either or both storing and processing data, a data transmission device and a switching device, comprising:
    an electrical connecting element connected in parallel to the switching device, said connecting element initially bridging the switching device and subsequently being partially removed or destroyed, so that a bridging of the switching device initially formed by the electrical connecting element is eliminated by partially removing or destroying the connecting element,
    wherein the switching device is connected to the data transmission device,
    wherein the usability of the data transmission device for a data transmission depends on the actuating state of the switching device, when the bridging of the switching device initially formed by the electrical connecting element has been eliminated.

13. The portable data carrier according to claim 12, wherein the data transmission device comprises an antenna for contactless transmission of data.

14. The portable data carrier according to claim 12, wherein the electrical connecting element has a receiving device for receiving energy for an at least partial removal or destruction of the electrical connecting element.

15. The portable data carrier according to claim 12, wherein the electrical connecting element is disposed in an area of high-embossing.

16. The portable data carrier according to claim 12, comprising a chip card.

\* \* \* \* \*